(12) United States Patent
Higgins et al.

(10) Patent No.: US 9,506,334 B2
(45) Date of Patent: Nov. 29, 2016

(54) PROCESS FOR RECOVERING OIL AND TREATING RESULTING PRODUCED WATER WITH CERAMIC MEMBRANES

(71) Applicant: Veolia Water Solutions & Technologies North America, Inc., Moon Township, PA (US)

(72) Inventors: Richard Higgins, Reading, MA (US); Stanton R. Smith, Belmont, MA (US); Bruce Bishop, Arlington, MA (US); David E. Gamache, Oswego, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 416 days.

(21) Appl. No.: 14/203,240

(22) Filed: Mar. 10, 2014

(65) Prior Publication Data
US 2014/0262253 A1    Sep. 18, 2014

Related U.S. Application Data

(60) Provisional application No. 61/788,187, filed on Mar. 15, 2013.

(51) Int. Cl.
*E21B 43/34* (2006.01)
*B01D 61/14* (2006.01)
(Continued)

(52) U.S. Cl.
CPC .............. *E21B 43/34* (2013.01); *B01D 61/147* (2013.01); *B01D 65/02* (2013.01); *B01D 65/08* (2013.01); *C02F 1/444* (2013.01); *B01D 71/02* (2013.01); *B01D 2321/04* (2013.01); *B01D 2321/08* (2013.01); *B01D 2321/162* (2013.01); *B01D 2321/164* (2013.01); *B01D 2321/168* (2013.01); *B01D 2321/2066* (2013.01); *C02F 1/66* (2013.01); *C02F 5/06* (2013.01);
(Continued)

(58) Field of Classification Search
CPC . E21B 43/34; B01D 61/147; B01D 2321/04; B01D 65/02; B01D 71/02; B01D 2313/04; B01D 2321/08; B01D 2321/162; B01D 2321/164; B01D 2321/168; B01D 65/08; C02F 1/66; C02F 2101/32; C02F 2103/10; C02F 2103/365; C02F 2303/16
See application file for complete search history.

(56) References Cited

U.S. PATENT DOCUMENTS 5,209,838 A * 5/1993 Sleppy ................ B01D 61/147
                                                           208/179
7,597,144 B2   10/2009 Minnich et al.
(Continued)

FOREIGN PATENT DOCUMENTS

WO       2012142204 A2    10/2012

OTHER PUBLICATIONS

Crittenden, John C., et al., Water Treatment: Principles and Design, p. 1012 (John Wiley & Sons, Inc., 2005).
Guerra, Katie, et al., Impact of operating conditions on permeate flux and process economics for cross flow ceramic membrane ultrafiltration of surface water, Separation and Purification Technology, vol. 87, pp. 47-53 (2012).
(Continued)

*Primary Examiner* — Daniel P Stephenson
(74) *Attorney, Agent, or Firm* — Coats and Bennett PLLC

(57) ABSTRACT

A method for cleaning a ceramic membrane used in an oil recovery process. The cleaning method includes online and offline modes. In the online mode, the method includes periodically backflushing the ceramic membrane with an aqueous media. In the offline mode, the method includes backpulsing or statically cleaning the ceramic membrane by utilizing an aqueous alkaline media, an aqueous acidic media, and a liquid hydrocarbon solution.

21 Claims, 3 Drawing Sheets

(51) Int. Cl.
*B01D 65/02* (2006.01)
*B01D 65/08* (2006.01)
*C02F 1/44* (2006.01)
*C02F 101/32* (2006.01)
*C02F 1/66* (2006.01)
*C02F 103/10* (2006.01)
*B01D 71/02* (2006.01)
*C02F 5/06* (2006.01)

(52) U.S. Cl.
CPC ...... *C02F 2101/32* (2013.01); *C02F 2103/10* (2013.01); *C02F 2209/02* (2013.01); *C02F 2303/16* (2013.01)

(56) References Cited

U.S. PATENT DOCUMENTS

| | | | |
|---|---|---|---|
| 7,815,804 | B2 | 10/2010 | Nagghappan |
| 2005/0082224 | A1 | 4/2005 | Glynn |
| 2009/0204419 | A1 | 8/2009 | Stewart |
| 2014/0262253 | A1* | 9/2014 | Higgins ............... E21B 43/34 166/267 |

OTHER PUBLICATIONS

Kim, et al., The effects of pretreatment on nanofiltration and reverse osmosis membrane filtration for desalination of oil sands process-affected water, Separation and Purification Technology, vol. 81, pp. 418-428 (2011).

Li, L., et al., "Purification of Produced Water by Ceramic Membranes: Material Screening, Process Design and Economics", Separation Science and Technology, Jan. 1, 2009, pp. 3455-3484, vol. 44, No. 15, New York, New York, USA, XP008169190.

Silvestre De Los Reyes, J., et al., "Preparation of water-in-oil and ethanol-in-oil emulsions by membrane emulsification", Fuel, IPC Science and Technology Press, Nov. 1, 2010, pp. 3482-3488, vol. 89, No. 11, Guildford, GB, XP027190030.

Silalahi, S., et al., "Cleaning strategies in ceramic microfiltration membranes fouled by oil and particulate matter in produced water", Desalination, Elsevier, Jan. 31, 2009, pp. 160-169, vol. 236, No. 1-3, Amsterdam, NL, XP025839572.

Lee, S., et al., "Preparation of ceramic membrane and application to the crossflow microfiltration of soluble waste oil", Materials Letters, North Holland Publishing Company, Feb. 1, 2002, pp. 266-271, vol. 52, No. 4-5, Amsterdam, NL, XP004329989.

* cited by examiner

PROCESS FOR RECOVERING OIL AND TREATING RESULTING PRODUCED WATER WITH CERAMIC MEMBRANES

Applicant claims priority based on U.S. Provisional Patent Application No. 61/788,187 filed Mar. 15, 2013. The subject matter of this application is incorporated herein by reference.

FIELD OF THE INVENTION

The present invention relates to recovering oil and treating resulting produced water and, more particularly, to treating produced water with ceramic membranes and utilizing online and offline processes to clean the ceramic membranes.

BACKGROUND OF THE INVENTION

Membrane filtration devices are utilized commercially for removal of suspended materials from produced waters derived from hydrocarbon production operations. The suspended materials that are removed include both dispersed hydrocarbons and fine inorganic particles, although this operation is commonly referred to as "de-oiling" due to the primary process objective of dispersed hydrocarbon removal. During the course of such de-oiling operations, the membrane elements become fouled due to deposition and adsorption of components of the produced water onto membrane surfaces and within the porous structure of the membrane and the membrane support. This leads to a requirement for periodic membrane cleaning methods that can reliably, repeatedly and efficiently remove all foulants and thereby regenerate the fluid (water) permeability capacity of the membrane element to its initial "clean" level.

SUMMARY OF THE INVENTION

The present invention relates to a method of cleaning membrane elements that have been fouled due to de-oiling produced water derived from heavy hydrocarbon production operations. Membrane fouling means that the permeability of the membrane element has been reduced to a level typically less than approximately 10% to approximately 20% of initial clean water permeability due to disposition of foulants within the membrane element structure. The method or process disclosed herein cleans the membrane elements. Cleaning, as used herein, means substantially regenerating the permeability of the membrane element. In one embodiment, the process of the present invention is designed to regenerate the permeability of the membrane element to a level that is approximately 90% or greater than the initial clean water permeability of the membrane element prior to its use in the filtration of produced water.

In one embodiment, the present invention entails a method of recovering oil from an oil well and separating produced water from the oil-water mixture. The produced water is directed to a ceramic membrane having a porous structure. Produced water is filtered with the ceramic membrane to remove suspended solids, precipitants, free oil and emulsified oil, for example. The ceramic membrane produces a permeate stream and a retentate stream. The method also includes cleaning the ceramic membrane in online and offline cleaning modes. In one embodiment, in the online mode the method includes periodically backflushing the ceramic membrane with an aqueous media having a pH of 13 or greater and a temperature of 60° C. or greater. In the offline mode, the process includes the following operations: (1) one or more clean-in-place operations where the clean-in-place cleaning fluid is an aqueous alkaline media at a pH of 13 or greater and a temperature of 60° C.; (2) one or more clean-in-place operations whereby the clean-in-place cleaning fluid is an aqueous acidic media containing dissolved citric acid; and (3) one or more clean-in-place operations where the clean-in-place fluid is a liquid hydrocarbon.

Other objects and advantages of the present invention will become apparent and obvious from a study of the following description and the accompanying drawings which are merely illustrative of such invention.

DESCRIPTION OF EXEMPLARY EMBODIMENTS

Figure 1:
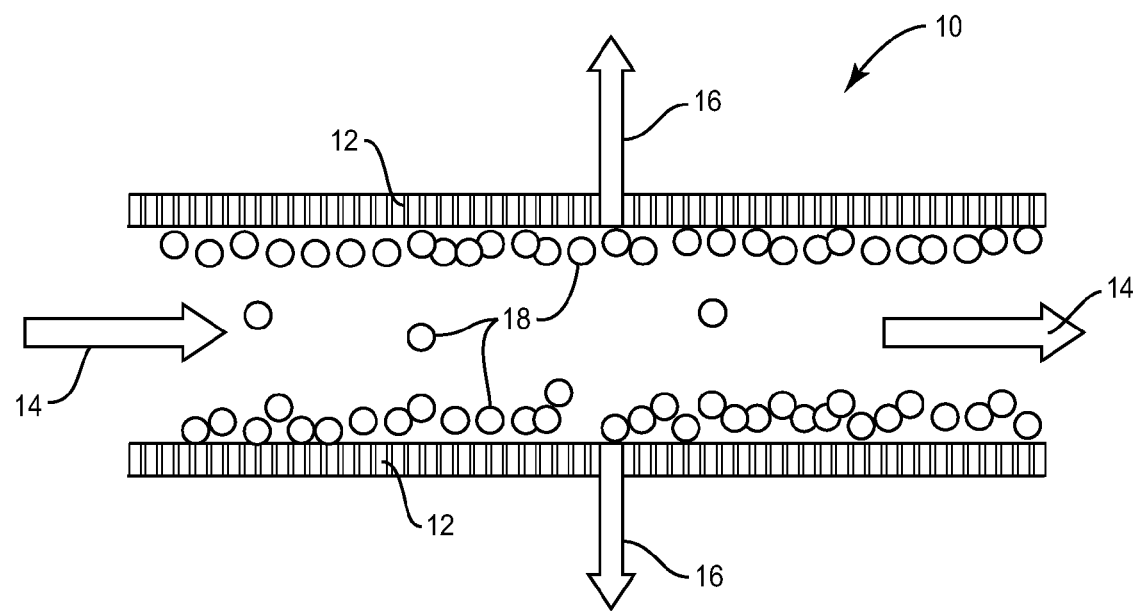
FIG. 1 is a high level schematic of a ceramic membrane showing a process fluid (produced water), the accumulation of fouling substances, and a permeate stream leaving the ceramic membrane.

Membrane filtration devices are utilized commercially for removal of suspended materials from produced waters derived from hydrocarbon production operations. The suspended materials that are removed include both dispersed hydrocarbons and fine inorganic particles, although this operation is commonly referred to as "de-oiling" due to the primary process objective of dispersed hydrocarbon removal. These filtration processes are operated in a crossflow mode and membrane elements used for de-oiling of hot produced water are typically ceramic in construction. During the course of such de-oiling operations, the membrane elements become fouled due to deposition and adsorption of components of the produced water onto membrane surfaces and within the porous structure of the membrane and the membrane support. The deposited materials composing the membrane "foulants" primarily derive from substances that are initially dissolved in the produced water and can include heavy non-polar hydrocarbons such as bitumen, polar hydrocarbons such as naphthenic acids and their salts, and inorganic phases such as silica, calcium carbonate, calcium sulfate, clays, iron, iron hydroxide, and iron sulfide. While well-controlled crossflow de-oiling processes generally limit the deposition of foulants to regions at, on or near the separation layer of the membrane element, periodic upstream process upsets or other adverse conditions are known to lead to foulant deposition during crossflow de-oiling processes in which the foulant is deposited significantly within the pores of the membrane sub-structure, including within the pores of the membrane structural support. Hence, both the complex compositional nature of the membrane foulant and the potential for foulant deposition within the membrane element in such produced water de-oiling operations lead to a requirement for periodic membrane cleaning methods that can reliably, repeatedly and efficiently remove all foulants and thereby regenerate the fluid (water) permeability capacity of the membrane element to its initial "clean" level.

The physical and chemical characteristics of produced waters derived from heavy hydrocarbon production operations are such that membrane elements of inorganic (and preferably, ceramic) construction are generally required for practical commercial de-oiling processes using such produced waters, due to the robust thermal, mechanical, pH-resistance, solvent-resistance, and hydrophilic properties of these structures. An advantageous ceramic membrane element configuration for these processes is the multi-channel honeycomb monolith-based configuration which includes a cross-flow direction of produced water through the element and perpendicular flow direction of de-oiled permeate fluid. However, the present invention is not limited to membrane devices of multi-channel honeycomb monolith-based configuration.

During de-oiling of a produced water using a membrane element configuration in a crossflow operating mode, suspended materials in the produced water are separated out at the membrane separation layer surface that coats the internal passages of the filtration element, producing a suspended materials-free (de-oiled) permeate that is collected on the permeate side of the membrane element. The majority of the retentate recirculates through the crossflow process loop and becomes increasingly laden with suspended material, while a minor fraction of the retentate is bled off such that an elevated equilibrium concentration of suspended material in the retentate stream is established. Both the elevated level of suspended materials in the retentate flow and the on-going adsorption and deposition of foulant materials within the membrane element pore structure lead to on-going reduction in permeability of the membrane structure. Backpulsing is used with crossflow membranes to clean and provide short term restoration of membrane element permeability. That is in ceramic crossflow membrane practice, one can utilize periodic brief back pulses with permeate to provide short term restoration of permeability. For example, such backpulsing entails automatic shut-off of normal crossflow operation and a very brief back pulse flow from the permeate side to the retentate side of the permeate produced by the membrane device, followed by a resumption of normal crossflow operation. The frequency of conducting these back pulses may be in the range of once every 10 minutes to once per hour. These back pulses provide a short term regeneration of flux but do not inhibit the fouling effects that occur over periods of several hours to several days.

Another periodic flux regeneration procedure for ceramic crossflow membrane filters is periodic backflushing with chemical cleaning fluids. This procedure, which is done with the membrane installed within the crossflow process system and hence is an "on-line" cleaning method, is referred to as chemically enhanced backflushing, or CEB. The frequency for performing CEB typically ranges from once per 4 hours to once per 48 hours. The chemical cleaning compound generally uses an available "clean" water source (e.g., potable water, well water, or reverse-osmosis product water) or permeate as the fluid basis, with addition of one or more soluble chemical compounds depending on the cleaning effect desired based on the expected nature of the membrane foulants. The soluble chemical compounds added to the CEB fluid basis are generally classified as acidic, alkaline, or oxidant. The mode of cleaning involves a sequence comprised of automatically shutting off normal crossflow operation, introduction by pumping or pressurization of chemical cleaning solution from the permeate side of the membrane to the retentate side of the membrane for a fixed period, followed by a fixed period of static soaking of a chemical cleaning fluid, followed by removal of the chemical cleaning fluid by flushing, draining, purging, etc. The total duration for the CEB operation is typically in the range of 5 to 30 minutes. More than one CEB operation may be conducted sequentially, using different cleaning fluid compositions, in order to remove foulants of differing chemical nature. Heated CEB fluids are typically preferred, as these increase the kinetics of the foulant removal processes. The effects of CEB are to periodically remove significant quantities of foulants from the membrane element such that the element regains a major portion of permeability lost during the prior crossflow separation/de-oiling operation.

Over longer periods of time, membrane element fouling can occur that is resistant to treatment by a combination of periodic backpulsing and CEB. This results in loss of membrane permeability over extended crossflow operating times and ultimately requires that one or more clean-in-place (CIP) operations be employed. A typical CIP operation utilizes chemical cleaning fluid compositions similar or identical to those used for CEB; however, the mode of operation for CIP involves either closed-loop (zero bleed) crossflow pumping of the CIP fluid, static soaking of the CIP fluid or some combination of these two modes. Typical frequencies for CIP operations are in the range of once per 3 days to once per year and the typical duration for CIP operations are 20 minutes to 24 hours. Heated CIP fluids are typically preferred, as these increase the kinetics of the foulant removal processes. CIP operations are performed with the crossflow membrane operation shut-down for a significant period of time, and are known as "off-line" cleaning methods. In extreme cases, CIP operations may be performed with the membrane elements having been removed from the crossflow process system.

For repeatable cleaning of membrane elements utilized in produced water de-oiling from heavy hydrocarbon production operations and, more specifically, for repeatable cleaning of ceramic membrane elements utilized in produced water de-oiling from SAGD operations, a method of sequential on-line and off-line cleaning has been discovered to provide optimal repeatable and reliable flux regeneration. This method of cleaning involves the following combination of steps:

1. Periodic on-line backflushes (CEB) with aqueous media at pH of 13 or greater and temperature of 60° C. or greater;
2. Off-line clean-in-place (CIP) in zero-bleed circulating and/or static mode involving at least the following steps:
   a. One or more CIP operations whereby the CIP fluid is aqueous alkaline media at pH of 13 or greater and temperature of 60° C. or greater.
   b. One or more CIP operations whereby the CIP fluid is aqueous acidic media containing 0.25% to 2% dissolved citric acid.
   c. One or more CIP operations whereby the CIP fluid is a liquid hydrocarbon.

As set forth above, the CEB fluid used for cleaning is an alkaline solution having a pH of 13 or greater. In one embodiment, the CEB fluid includes a clean water source as the base and has added thereto sodium hydroxide. The concentration of sodium hydroxide can vary, but in one embodiment the sodium hydroxide constitutes approximately 0.4% wt. to approximately 10.0% wt. of the CEB fluid. Prior to directing the CEB fluid through the ceramic membrane, the CEB fluid is heated to at least 60° C. In one embodiment, the CEB fluid is heated to approximately 90° C. to approximately 105° C. After being heated, the CEB fluid is directed into the ceramic membrane, and more particularly, the CEB fluid is backflushed from the permeate side to the retentate side. The duration of this online CEB cleaning process can vary, but in one embodiment it is contemplated that a duration of 5 to 30 minutes is effective. Furthermore, the frequency of online CEB cleaning can vary, but in one embodiment the frequency ranges from once every 4 hours to once every 48 hours.

Now turning to the offline clean-in-place protocol, it is noted that this process in a preferred embodiment entails at least three steps. Each of the steps of the offline clean-in-place procedure can be conducted in a crossflow mode with zero bleed or can be conducted in a static or soaking mode. Furthermore, the static or soaking mode of CIP can be initiated by first backflushing or pumping the CIP fluid from the permeate side to the retentate side of the membrane prior to CIP soaking. Thus in lieu of or in addition to zero-bleed circulation and/or the static mode, the CIP mode may include backflushing the CIP fluids from the permeate side of the membrane to the retentate side. One step in the offline clean-in-place procedure entails cleaning with a fluid that comprises an aqueous alkaline media. The pH is 13 or greater and the temperature of this fluid is at least 60° C. In a preferred embodiment, this aqueous alkaline media includes sodium hydroxide at a concentration of approximately 0.4 to 10.0 wt %. The aqueous alkaline media is heated prior to injection into the ceramic membrane and, in some cases, the temperature of the aqueous alkaline media is raised to approximately 90° C. to approximately 105° C.

In another step of the offline clean-in-place procedure, the process utilizes an aqueous acidic media containing approximately 0.25% wt. to approximately 2.00% wt. of dissolved citric acid.

The third step or process in the offline clean-in-place procedure entails a fluid in the form of a liquid hydrocarbon. The liquid hydrocarbon fluid can vary but, in some embodiments, will include one or more of the compounds of xylene, toluene, benzene, diluent or petroleum distillates. In one particular embodiment, the liquid hydrocarbon clean-in-place media is neat xylene. In some embodiments, the cleaning treatment with the liquid hydrocarbon media is followed by a rinsing operation using a water-miscible liquid organic which, in some cases, comprises acetone.

As noted above, the offline cleaning mode may include backflushing or pumping the CIP fluid from the permeate side of the membrane to the retentate side of the membrane. In this embodiment, backflushing the CIP fluid from the permeate side to the retentate side can be followed by a static soak period of that fluid.

With respect to the offline clean-in-place procedure just described, the particular cleaning protocol is discussed in the form of three steps or three processes. It should be pointed out that these processes do not have to be performed in any particular sequence or order.

Example 1

A CeraMem® ceramic honeycomb monolith-based microfiltration membrane element (Type FE-S2S-0200-CC) was installed in a crossflow process system utilized for de-oiling of produced water from a steam-assisted gravity drain (SAGD) process for bitumen production from oil sands. The membrane element was employed in de-oiling of a SAGD-derived produced water stream for a period of several days, during which periodic backpulsing and CEB using pH 13 water were utilized for periodic flux regeneration. Subsequent to this period of crossflow de-oiling operation, the membrane element was fouled to an extent such that its water permeability was less than 1% of its initial clean water permeability. The membrane element was removed to a separate crossflow process system used for crossflow CIP operations.

Initial CIP of this element was performed using pH 12 sodium hydroxide solution at about 95° C. After four repeated cycles at these conditions, clean water permeability recovery of the element was minimal, and the CIP solution was changed to pH 14 sodium hydroxide solution at about 95° C. Three total pH 14 cycles were used, each with intervening 0.3% citric acid CIP steps. At the end of these CIP cycles, the clean water permeability of the element increased to about 18% of its initial (pre-de-oiling) clean water permeability. A final hot CIP step in crossflow was performed using 5 g/l Hydrex™ 4501 oxidizing cleaner, resulting in a clean water permeability of 32% of its initial (pre-de-oiling) clean water permeability.

The part was subsequently removed from the crossflow process system, dried and sectioned into several smaller test pieces. Cut edges of the test pieces were sealed with sealants to prevent leakage between the membrane element section feed side and permeate side. The clean water permeabilities of test pieces were then measured to confirm that they matched the clean water permeability of the full membrane element prior to sectioning. Next, one test piece was soaked statically in a container of xylene for about 30 minutes, then was removed to a second container of neat xylene where it was again soaked for about 30 minutes. This procedure was repeated on a second test piece, which then was removed to a third container of neat xylene where it was again soaked for about 30 minutes. Both test pieces were subsequently immersed in three containers of acetone for about 15 minutes per immersion. Finally, the test pieces were evaluated for clean water permeability. The test piece that had soaked two times in xylene had a clean water permeability of 81% of its initial (pre-de-oiling) clean water permeability, while the test piece that had soaked three times in xylene had a clean water permeability of 100% of its initial (pre-de-oiling) clean water permeability (i.e., the latter test piece was fully regenerated).

Example 2

A CeraMem® ceramic honeycomb monolith-based ultrafiltration membrane element (Type FE-S2S-0050-CC) was installed in a crossflow process system utilized for de-oiling of produced water from a steam-assisted gravity drain (SAGD) process for bitumen production from oil sands. The membrane element was employed in de-oiling of a SAGD-derived produced water stream for a period of several days, during which periodic backpulsing and CEB using pH 13 water were utilized for periodic flux regeneration. Subsequent to this period of crossflow de-oiling operation, the membrane element was fouled to an extent such that its water permeability was less than 1% of its initial clean water permeability.

The membrane element was subsequently removed from the crossflow de-oiling process system and sectioned into several smaller test pieces. Cut edges of the test pieces were sealed with sealants to prevent leakage between the membrane element section feed side and permeate side. The clean water permeabilities of test pieces were then measured to confirm that they matched the clean water permeability of the full membrane element prior to sectioning. One test piece was mounted in a small crossflow test system. The piece was subjected to CEB using pH 14 sodium hydroxide solution at about 80° C., with removal of the spent (dirty)

CEB solution from the feed side of the test piece. This procedure was repeated a total of three consecutive times. The full procedure was next repeated on a second test piece. The repeated CEB's resulted in a clean water permeability of 35% of initial (pre-de-oiling) clean water permeability for both test pieces.

Next, one of the two pieces was soaked statically in a container of xylene for about 30 minutes, then was removed to a second container of neat xylene where it was again soaked for about 30 minutes, then was removed to a third container of neat xylene where it was again soaked for about 30 minutes. This process was repeated for the second test piece, except that the xylene was replaced with hydrocarbon diluents in the case of the second test piece. Both test pieces were subsequently immersed in three containers of acetone for about 15 minutes per immersion. Finally, the test pieces were evaluated for clean water permeability. The test piece that had soaked three times in xylene had a clean water permeability of 100% of its initial (pre-de-oiling) clean water permeability, while the test piece that had soaked three times in hydrocarbon diluent had a clean water permeability of 93% of its initial (pre-de-oiling) clean water permeability.

Example 3

A CeraMem® ceramic honeycomb monolith-based ultrafiltration membrane element (Type FE-S2S-0050-CC) was installed in a crossflow process system utilized for de-oiling of produced water from a steam-assisted gravity drain (SAGD) process for bitumen production from oil sands. The membrane element was employed in de-oiling of a SAGD-derived produced water stream for a period of several days, during which periodic backpulsing and CEB using pH 13 water were utilized for periodic flux regeneration. Subsequent to this period of crossflow de-oiling operation, the membrane element was fouled to an extent such that its water permeability was less than 1% of its initial clean water permeability. The membrane element was removed to a separate crossflow process system used for crossflow CIP operations.

Initial CIP of this element was performed using pH 14 sodium hydroxide solution at about 95° C. After three repeated cycles at these conditions, two additional pH 14, 95° C. cycles were used, each with intervening 0.3% citric acid CIP steps. Next, three repeated CIP cycles using 5 g/l Hydrex™ 4501 oxidizing cleaner with intervening 0.3% citric acid CIP, were performed. At the end of these CIP cycles, the clean water permeability of the element increased to about 40% of its initial (pre-de-oiling) clean water permeability.

The element was subsequently removed from the crossflow process system and placed in a steel open-top container. The container was filled with neat xylene to fully flush the entire membrane element for about 30 minutes, after which the spent xylene (containing dissolved foulants) was pumped out of the container. This procedure was repeated a total of six times, performed consecutively. The same procedure was next performed, three times consecutively, using acetone. Finally, the same procedure was next performed, three times consecutively, using warm ultrafiltered water. Subsequently, the clean water permeability of the element was measured as 98% of its initial (pre-de-oiling) clean water permeability, indicating that it was substantially completely regenerated.

Figure 2:
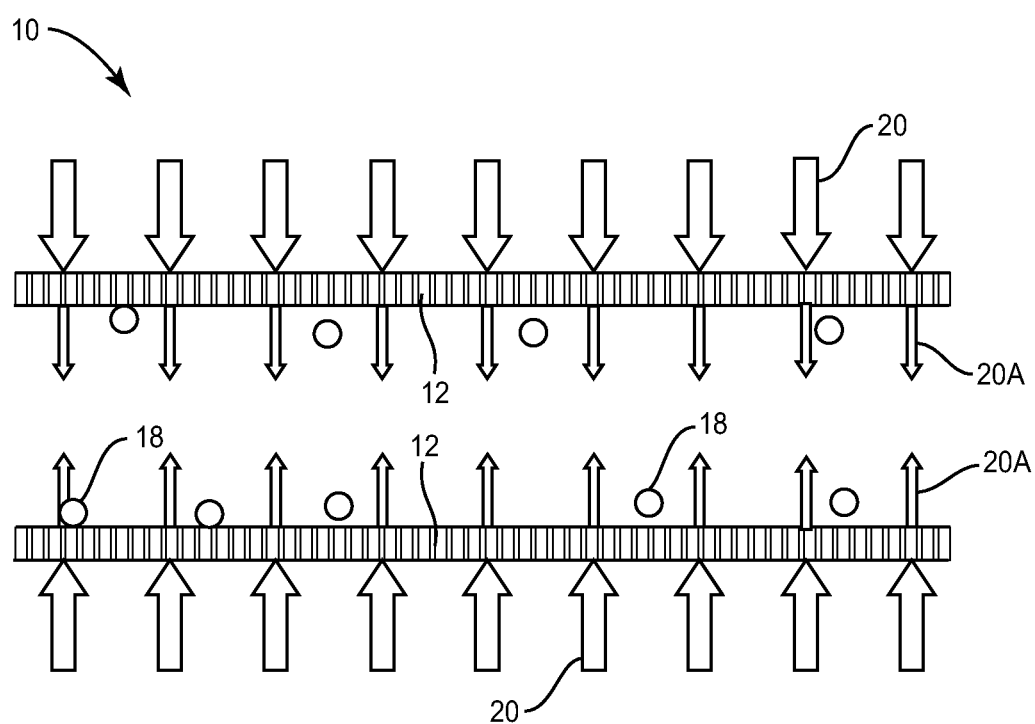
FIG. 2 is a high level schematic illustration showing a chemical enhanced backflushing (CEB) cleaning mode for cleaning the ceramic membrane.
Figure 3:
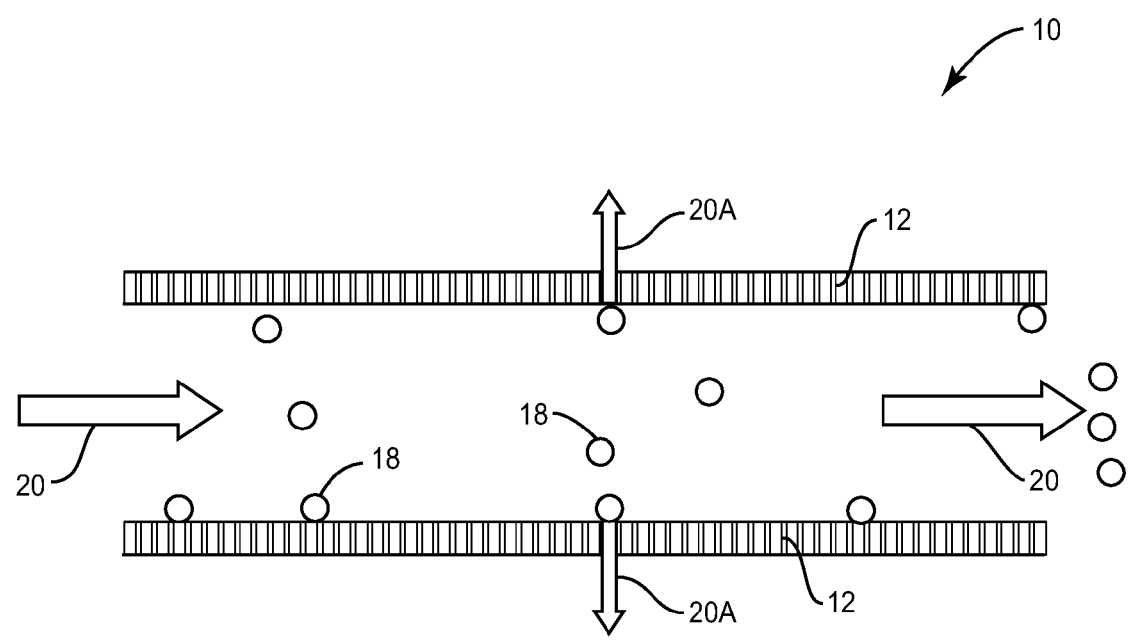
FIG. 3 is a schematic illustration of the ceramic membrane illustrating a clean-in-place (CIP) cleaning mode for cleaning the ceramic membrane.

FIGS. 1-3 are high level schematics of a ceramic membrane, indicated generally by the numeral 10, illustrating the basic filtering process of the ceramic membrane (FIG. 1), the CEB cleaning mode (FIG. 2) and the CIP cleaning mode (FIG. 3). In FIG. 1, the porous ceramic membrane structure is referred to by the numeral 12. Arrows 14 represent the process flow which, in the case of a SAGD application, represent produced water. Arrows 16 represent the permeate flowing from the porous membrane structure 12. Circles 18 represent fouling substance or material that tend to be deposited on the membrane separation layer or embedded in the porous structure of the membrane body. As seen in FIG. 1, the process fluid flows left to right and the fouling substances or materials carried by the produced water tend to accumulate in the ceramic membrane and decrease the permeability of the membrane structure.

Turning to FIG. 2, there is illustrated therein the chemically enhanced backflushing cleaning process that is designed to restore some permeability, as discussed above, to the porous membrane body structure, as well as the membrane separation layer that lines the multiplicity of feedwater channels found in the ceramic membrane. Note that the cleaning solution, indicated by the arrows 20, is backpulsed through the ceramic membrane 10. In particular, the backpulsing of the cleaning solution includes a chemical cleaning agent, is directed from the permeate side of the ceramic membrane to the retentate side. In FIG. 2, the smaller arrows 20A represent the cleaning solution after it has been backpulsed through the porous ceramic membrane structure. It follows that the fouling substance and materials are dislodged and end up in the retentate.

FIG. 3 is a high level illustration of the clean-in-place mode of cleaning the ceramic membrane. Here cleaning solution, represented by arrows 20, moves through the various feedwater channels of the ceramic membrane under pressure. As discussed above, the cleaning solution moves through the feed channels of the ceramic membrane in a crossflow configuration and is generally recirculated in a closed loop. During this process, a portion of the cleaning solution can be directed perpendicular from the retentate side to the permeate side of the ceramic membrane. This is represented by arrows 20A. This too has the effect of cleaning the membrane separation layer that lines the feedwater channels, as well as the porous structure of the membrane body. As discussed above, another form of clean-in-place entails statically soaking the ceramic membrane body with the cleaning solution for a selected period of time.

The online and offline ceramic membrane cleaning process discussed herein is applied in an oil and gas recovery process. In an oil recovery process, an oil-water mixture is recovered from an oil well. Oil is separated from the oil-water mixture, leaving what is referred to as produced water. The produced water includes residual oil, that is free oil, emulsified oil and dissolved oil or organics. Further, the produced water will often include hardness, silica and other contaminants that might scale or foul downstream equipment and which are typically removed in treatment processes. For example, lime softening is used to remove hardness and silica from produced water. Lime, along with other alkaline reagents, can be mixed with the produced water and this will result in hardness compound, such as calcium carbonate, precipitating from the produced water. Further, it is known to add magnesium oxide which will result in the precipitation of magnesium hydroxide, which in turn will adsorb silica and pull silica out of solution. In the process contemplated by the present invention, once the produced water has been appropriately pretreated, the produced water is directed to the ceramic membrane which removes suspended solids, precipitants, free oil and emulsified oil. The ceramic membrane produces a permeate and a retentate. The retentate includes the removed suspended solids, precipitants, free oil and emulsified oil. The permeate constitutes the relatively clean produced water stream that is emitted by the ceramic membrane. During the course of filtering or treating the produced water, the permeability of the ceramic membrane will decrease and will require cleaning. Thus, the cleaning protocol or procedures outlined herein are appropriate for cleaning the ceramic membrane that has been subjected to filtering produced water.

Details of the process for treating produced water is not dealt with herein in detail because many of the processes involved in treating produced water are well known. Reference is made to U.S. Patent Publication 2012/0255904 and U.S. Pat. No. 7,597,144. These two publications describe in detail various produced water treatment processes that entail the use of ceramic membranes. The disclosures of these two publications are expressly incorporated herein by reference.

Details of the ceramic membrane are not dealt with herein because such is not per se material to the present invention, and further, ceramic membranes are known in the art. For a review of general ceramic membrane technology, one is referred to the disclosures found in U.S. Pat. Nos. 6,165,553 and 5,611,931, the contents of which are expressly incorporated herein by reference. These ceramic membranes, useful in the processes disclosed herein, can be of various types. In some cases the ceramic membrane may be of the type that produces both a permeate stream and a reject stream. On the other hand, the ceramic membranes may be of the dead head type, which only produces a permeate stream and from time-to-time the retentate is backflushed or otherwise removed from the membrane.

The structure and materials of ceramic membranes as well as the flow characteristics of ceramic membranes varies. When ceramic membranes are used to purify produced water, the ceramic membranes are designed to withstand relatively high temperatures as it is not uncommon for the produced water being filtered by the ceramic membranes to have a temperature of approximately 90° C. or higher.

Ceramic membranes normally have an asymmetrical structure composed of at least two, mostly three, different porosity levels. Indeed, before applying the active, microporous top layer, an intermediate layer is formed with a pore size between that of the support and a microfiltration separation layer. The macroporous support ensures the mechanical resistance of the filter.

Ceramic membranes are often formed into an asymmetric, multi-channel element. These elements are grouped together in housings, and these membrane modules can withstand high temperatures, extreme acidity or alkalinity and high operating pressures, making them suitable for many applications where polymeric and other inorganic membranes cannot be used. Several membrane pore sizes are available to suit specific filtration needs covering microfiltration and ultrafiltration ranges.

Ceramic membranes today run the gamut of materials (from alpha alumina to zircon). The most common membranes are made of Al, Si, Ti or Zr oxides, with Ti and Zr oxides being more stable than Al or Si oxides. In some less frequent cases, Sn or Hf are used as base elements. Each oxide has a different surface charge in solution. Other membranes can be composed of mixed oxides of two of the previous elements, or are established by some additional compounds present in minor concentration. Low fouling polymeric coatings for ceramic membranes are also available.

Ceramic membranes are typically operated in the cross flow filtration mode. This mode has the benefit of maintaining a high filtration rate for membrane filters compared with the direct flow filtration mode of conventional filters. Cross flow filtration is a continuous process in which the feed stream flows parallel (tangential) to the membrane filtration surface and generates two outgoing streams.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil from an oil well and treating resulting produced water, comprising:
    recovering an oil-water mixture from the oil well;
    separating the produced water from the oil-water mixture;
    directing the produced water to and through a ceramic membrane having a porous structure;
    filtering the produced water with the ceramic membrane to produce a permeate stream and a retentate stream;
    cleaning the ceramic membrane in online and offline modes comprising:
        a. in the online mode periodically backflushing the ceramic membrane with an aqueous media having a pH of 13 or greater and a temperature of 60° C. or greater:
        b. in the offline mode, backpulsing or statically cleaning the ceramic membrane by performing:
            i. one or more clean-in-place operations utilizing an aqueous alkaline media having a pH of 13 or greater and a temperature of 60° C. or greater;
            ii. one or more clean-in-place operations utilizing an aqueous acidic media containing approximately 0.25% to approximately 2.0% dissolved citric acid; and
            iii. one or more clean-in-place operations utilizing a liquid hydrocarbon solution.

2. The method of claim 1 wherein the aqueous acidic media contains approximately 0.25% to approximately 2.0% dissolved citric acid.

3. The method of claim 1 wherein the time period for cleaning the ceramic membrane in the online mode is approximately 5 to approximately 30 minutes and wherein the time period for cleaning the ceramic membrane in the offline mode is approximately 20 minutes to approximately 24 hours.

4. The method of claim 1 including backpulsing the aqueous alkaline media, aqueous acidic media, or the liquid hydrocarbon solution from a permeate side through the ceramic membrane to a retentate side of the ceramic membrane; and soaking the ceramic membrane in the aqueous alkaline media, aqueous acidic media, or the liquid hydrocarbon solution.

5. The method of claim 1 including removing free oil and emulsified oil from the produced water with the ceramic membrane.

6. The method of claim 1 including initiating cleaning the ceramic membrane when the permeability of the ceramic membrane is less than 20% of initial clean water permeability.

7. The method of claim 1 including initiating cleaning by online backflushing at a frequency of approximately once per 4 hours to once per 48 hours.

8. The method of claim 1 including online backflushing with an aqueous alkaline media containing approximately 0.40% wt. to approximately 10.0% wt. of dissolved sodium hydroxide.

9. The method of claim 8 including heating the aqueous alkaline media to a temperature of approximately 90° C. to approximately 105° C. and backflushing the ceramic membrane with the heated aqueous alkaline media.

10. The method of claim 1 wherein the offline clean-in-place cleaning of the ceramic membrane is conducted in a crossflow mode.

11. The method of claim 1 wherein the offline clean-in-place cleaning of the ceramic membrane is conducted in a static or soaking mode.

12. The method of claim 1 wherein the clean-in-place aqueous alkaline media includes approximately 0.40% wt. to approximately 10.0% wt. of dissolved sodium hydroxide.

13. The method of claim 1 wherein the liquid hydrocarbon clean-in-place media includes one or more of the compounds xylene, toluene, benzene, diluents, or petroleum distillates.

14. The method of claim 13 wherein the liquid hydrocarbon clean-in-place media is neat xylene.

15. The method of claim 1 wherein in the offline mode the method includes soaking the ceramic membrane with the liquid hydrocarbon solution.

16. The method of claim 1 wherein after cleaning the ceramic membrane with the liquid hydrocarbon solution, the method includes rinsing the ceramic membrane with a water-miscible liquid organic.

17. The method of claim 16 wherein the water-miscible liquid organic comprises acetone.

18. A method of recovering oil from an oil well and treating resulting produced water, comprising:
  recovering an oil-water mixture from the oil well;
  separating the produced water from the oil-water mixture;
  directing the produced water to and through a ceramic membrane having a porous structure;
  filtering the produced water with the ceramic membrane to produce a permeate stream and a retentate stream;
  cleaning the ceramic membrane in online and offline modes comprising:
    a. in the online mode periodically backflushing the ceramic membrane with an aqueous media having a pH of 13 or greater and a temperature of 60° C. or greater:
    b. in the offline mode, backpulsing or statically cleaning the ceramic membrane by performing:
      i. one or more clean-in-place operations utilizing an aqueous alkaline media having a pH of 13 or greater and a temperature of 60° C. or greater;
      ii. one or more clean-in-place operations utilizing an aqueous acidic media; and
      iii. one or more clean-in-place operations utilizing a liquid hydrocarbon solution;
    c. wherein the time period for cleaning the ceramic membrane in the online mode is approximately 5 to approximately 30 minutes and wherein the time period for cleaning the ceramic membrane in the offline mode is approximately 20 minutes to approximately 24 hours.

19. A method of recovering oil from an oil well and treating resulting produced water, comprising:
  recovering an oil-water mixture from the oil well;
  separating the produced water from the oil-water mixture;
  directing the produced water to and through a ceramic membrane having a porous structure;
  filtering the produced water with the ceramic membrane to produce a permeate stream and a retentate stream;
  cleaning the ceramic membrane in online and offline modes comprising:
    a. in the online mode periodically backflushing the ceramic membrane with an aqueous media having a pH of 13 or greater and a temperature of 60° C. or greater:
    b. in the offline mode, backpulsing or statically cleaning the ceramic membrane by performing:
      i. one or more clean-in-place operations utilizing an aqueous alkaline media having a pH of 13 or greater and a temperature of 60° C. or greater;
      ii. one or more clean-in-place operations utilizing an aqueous acidic media; and
      iii. one or more clean-in-place operations utilizing a liquid hydrocarbon solution;
    c. initiating cleaning the ceramic membrane when the permeability is less than 20% of initial clean water permeability.

20. A method of recovering oil from an oil well and treating resulting produced water, comprising:
  recovering an oil-water mixture from the oil well;
  separating the produced water from the oil-water mixture;
  directing the produced water to and through a ceramic membrane having a porous structure;
  filtering the produced water with the ceramic membrane to produce a permeate stream and a retentate stream;
  cleaning the ceramic membrane in online and offline modes comprising:
    a. in the online mode periodically backflushing the ceramic membrane with an aqueous media having a pH of 13 or greater and a temperature of 60° C. or greater:
    b. in the offline mode, backpulsing or statically cleaning the ceramic membrane by performing:
      i. one or more clean-in-place operations utilizing an aqueous alkaline media having a pH of 13 or greater and a temperature of 60° C. or greater;
      ii. one or more clean-in-place operations utilizing an aqueous acidic media; and
      iii. one or more clean-in-place operations utilizing a liquid hydrocarbon clean-in-place media comprising neat xylene.

21. A method of recovering oil from an oil well and treating resulting produced water, comprising:
  recovering an oil-water mixture from the oil well;
  separating the produced water from the oil-water mixture;
  directing the produced water to and through a ceramic membrane having a porous structure;
  filtering the produced water with the ceramic membrane to produce a permeate stream and a retentate stream;
  cleaning the ceramic membrane in online and offline modes comprising:
    a. in the online mode periodically backflushing the ceramic membrane with an aqueous media having a pH of 13 or greater and a temperature of 60° C. or greater:
    b. in the offline mode, backpulsing or statically cleaning the ceramic membrane by performing:
      i. one or more clean-in-place operations utilizing an aqueous alkaline media having a pH of 13 or greater and a temperature of 60° C. or greater; and
      ii. one or more clean-in-place operations utilizing an aqueous acidic media;

c. in the offline mode, soaking the ceramic membrane with a liquid hydrocarbon solution.

\* \* \* \* \*